United States Patent [19]

Hays et al.

[11] Patent Number: 5,659,891
[45] Date of Patent: Aug. 19, 1997

[54] MULTICARRIER TECHNIQUES IN BANDLIMITED CHANNELS

[75] Inventors: William D. Hays; Dennis Cameron, both of Jackson, Miss.; Walter Roehr, Reston, Va.

[73] Assignee: Mobile Telecommunication Technologies, Jackson, Miss.

[21] Appl. No.: 480,718

[22] Filed: Jun. 7, 1995

[51] Int. Cl.$^6$ .................................................. H04B 1/02
[52] U.S. Cl. ........................... 455/103; 455/45; 370/339; 370/343
[58] Field of Search .................. 455/103, 104, 455/17, 46, 59, 60, 61, 62, 49.1, 45; 375/260; 370/69.1, 70, 38, 40, 121; 340/825.44

[56] References Cited

U.S. PATENT DOCUMENTS

| | | | |
|---|---|---|---|
| 3,488,445 | 1/1970 | Chang | 370/69.1 |
| 3,914,554 | 10/1975 | Seidel | 179/15.55 R |
| 4,244,047 | 1/1981 | Perkins | 370/69 |
| 5,163,181 | 11/1992 | Koontz | 455/103 |
| 5,343,499 | 8/1994 | Jasper et al. | 375/39 |
| 5,392,452 | 2/1995 | Davis | 455/38.1 |

OTHER PUBLICATIONS

47 C.F.R. § 22.106 (1994).

*Primary Examiner*—Reinhard J. Eisenzopf
*Assistant Examiner*—Lee Nguyen
*Attorney, Agent, or Firm*—Finnegan, Henderson, Farabow, Garrett and Dunner

[57] ABSTRACT

A method of multicarrier modulation using co-located transmitters to achieve higher transmission capacity for mobile paging and two-way digital communication in a manner consistent with FCC emission mask limits. Co-location of the transmitters obviates the need for stringent, symmetrical subchannel interference protection and provides for a wider range of operating parameters, including peak frequency deviation, bit rate, and carrier frequencies, to obtain optimal transmission performance.

5 Claims, 11 Drawing Sheets

FIGURE 5A 2400 max deviation, 6k bps bit rate, 4590 Hz carrier

FIGURE 5B

FIGURE 6A 1800 max deviation, 6.4k bps bit rate, 5150 Hz carrier

FIGURE 6B

FIGURE 7A 2100 max deviation, 6.4k bps bit rate, 4750 Hz carrier

FIGURE 7B

MULTICARRIER TECHNIQUES IN BANDLIMITED CHANNELS

FIELD OF THE INVENTION

The present invention relates generally to multicarrier modulation techniques, and more particularly, to a method for operating more than one carrier in a single mask-defined, bandlimited channel assigned to mobile paging use.

DISCUSSION OF RELATED ART

The rising popularity of mobile paging services has resulted in increased competition for air time on the limited number of radio-frequency channels allocated by the Federal Communications Commission (FCC) for mobile paging use. As demand begins to approach and even exceed the capacity of assigned channels to handle transmission traffic, delays in service and deterioration of transmission quality are becoming a major concern to mobile paging users and providers.

The ability of mobile paging providers to successfully address the problem of transmission saturation is limited by the finite range of air space dedicated to mobile paging use. Channels assigned by the FCC to radio paging providers typically have narrow bandwidths (e.g. 25 kHz) and are subject to stringent emission mask limitations.

One method that can be used to allow greater access to a particular channel is to increase the number of messages transmitted over the channel in a given period. This can be achieved, for example, by increasing the data rate of the transmission or by reducing the length of transmitted messages. U.S. Pat. No. 5,392,452 issued to Davis, for example, describes a high data rate transmission scheme for handling lengthy messages in a paging system. Systems employing techniques to increase transmission rates, however, are prone to higher error rates. In addition, high data rates tend to generate greater transmission interference.

Another approach to addressing the saturation problem is to increase the transmission capacity of the channel itself. Traditionally, mobile paging providers have operated only one transmission signal, or carrier, within an assigned channel. While this mode ensures simplicity of operation and compliance with FCC mask requirements, it does not provide the most efficient use of the limited frequency bandwidth available. Successful multicarrier modulation, however, is difficult to achieve without incurring unacceptable levels of interference.

The problem of interference is compounded when a receiver is attempting to acquire a signal from a distant transmitter while in close proximity to a transmitter operating on an adjacent channel. In this environment, the receiver may experience difficulty in detecting the signal from the distant source due to interference from the signal transmitted on the adjacent channel from the closer source. This is known as the "near-far" problem. This problem can be avoided by co-locating the transmitters at essentially the same geographic location.

The FCC requires signals to be confined within emission limit masks in order to prevent interference caused by signals straying or spilling into adjacent channels. FCC masks typically require the power spectral density of a signal to be attenuated at least 70 dB at the band edge. Despite these stringent constraints, some carrier overlap can be expected, even when the maximum carrier spacing consistent with the FCC mask requirements is utilized. Such overlap can result in unacceptable interference of the carriers, making it difficult for the receivers to acquire the proper carrier.

Thus, a traditional multicarrier design would commonly require the same stringent protection levels between subchannels. Specifically, when more than one carrier is operating within a single channel, each carrier is traditionally confined to a submask defining a subchannel internal to the channel. The carriers are symmetrically located within the channel such that they are evenly spaced relative to each other and to the band edges of the primary mask defining the primary channel. Although such symmetry achieves maximum inter-carrier spacing and reduces the opportunity for interference among adjacent carriers, it often necessitates the need for sophisticated receiver and transmitter schemes.

SUMMARY OF THE INVENTION

It is an object of this invention to achieve higher capacity over a bandlimited channel for paging without the need for stringent subchannel interference protection. Additional objects, advantages, and features of the invention will be set forth in part in the description that follows, and in part will be obvious from the description, or may be learned by practice of the invention. The advantages of the invention will be realized and attained by means of the instrumentalities and combinations particularly pointed out in the written description and claims herein, as well as the appended drawings.

To achieve these and other objects, advantages, and features in accordance with the purpose of the invention, as embodied and broadly described herein, the invention provides a method of operating a plurality of paging carriers in a single mask-defined, bandlimited channel comprising the step of transmitting the carriers from the same location at center frequencies within the channel such that the frequency difference between the center frequency of the outer most carriers and the band edge of the mask defining said channel is more than half the frequency difference between the center frequencies of each adjacent carrier.

In another aspect, the invention provides a method of operating at least two paging carriers each in a corresponding subchannel of a single mask-defined, bandlimited channel comprising the step of transmitting the carriers from the same location with each carrier centrally located in a corresponding subchannel wherein the frequency difference between the center frequency of the outer most subchannels and the band edge of the mask defining said channel is more than half the frequency difference between the center frequencies of each adjacent carrier.

in another aspect, the invention provides a method of operating a plurality of carriers in a single mask-defined, bandlimited channel to achieve higher transmission capacity over the channel in a mobile paging system having a plurality of transmitters generating a plurality of modulated carriers over a single bandlimited channel and a plurality of mobile, independent receiving units capable of receiving one of said plurality of carriers. The method comprises the steps of co-locating the plurality of transmitters such that the plurality of carriers can be emanated from the same transmission source, and transmitting the carriers over a plurality of subchannels spaced asymmetrically within the mask defining the channel.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION OF THE PREFERRED EMBODIMENTS

Reference will now be made in detail to the presently preferred embodiments of the invention, examples of which are illustrated in the accompanying drawings. Wherever possible, the same reference numbers will be used throughout the drawings to refer to the same or like parts.

Figure 1:
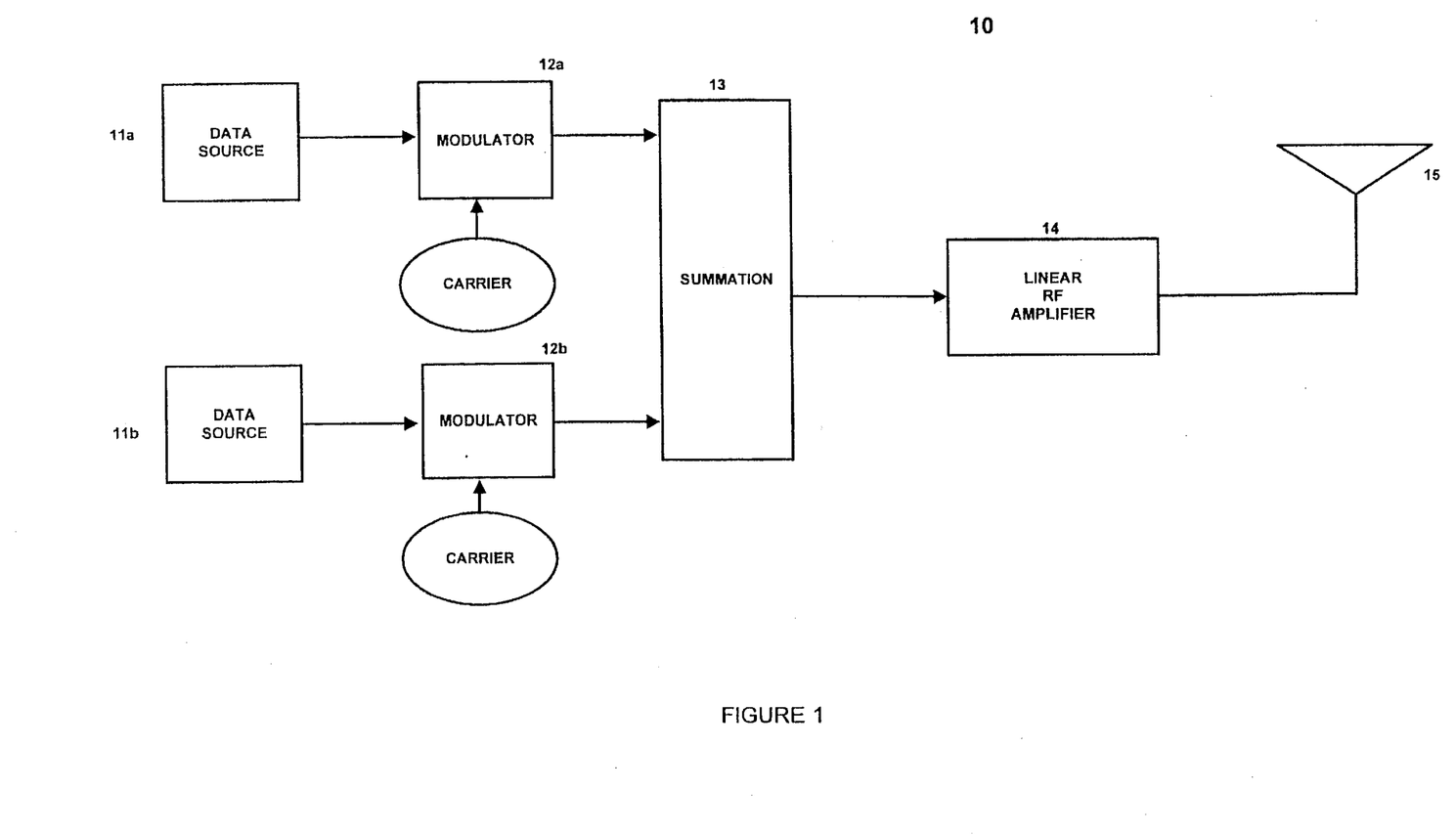
FIG. 1 is a block diagram of a co-located multicarrier transmitter system in a linear amplifier configuration for using the present invention.

Referring to FIG. 1, a co-located multicarrier transmitter system in a linear amplifier configuration 10 comprises a first and second data source, 11a and 11b, a first and second modulator, 12a and 12b, a summation circuit 13, a linear RF amplifier 14, and an antenna 15. The first and second data sources, 11a and 11b, generate a respective first and second digital bit stream which are provided to respective first and second modulators, 12a and 12b. Each modulator converts the incoming digital information into a representative modulated signal or carrier. The outputs of each modulator are then combined into a single output signal by summation circuit 13, the output of which is fed into linear RF amplifier 14. The combined output signal is then applied to antenna 15 for transmission in a bandlimited channel.

Figure 2:
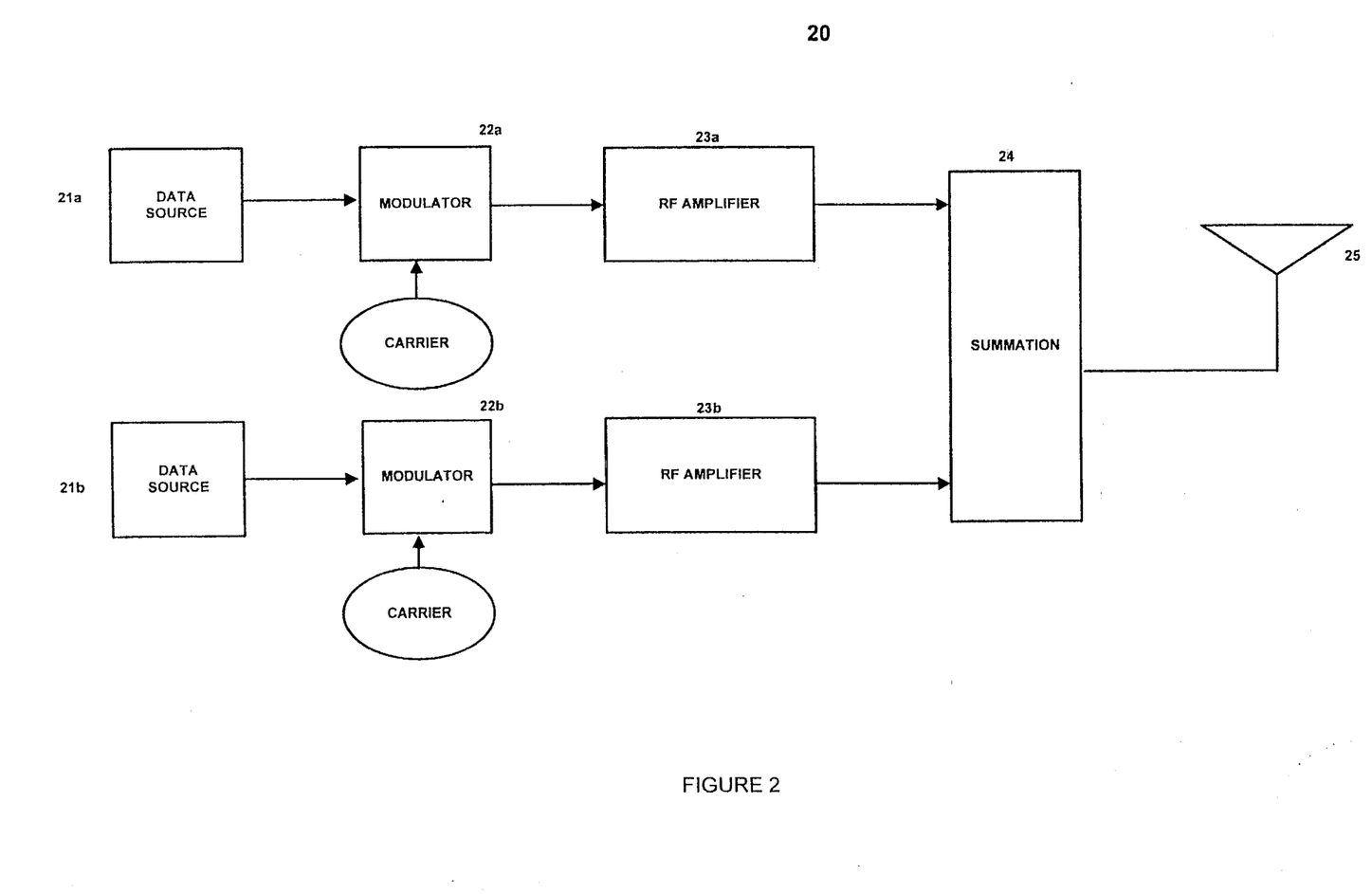
FIG. 2 is a block diagram of a co-located multicarrier transmitter system in a composite transmitter configuration for using the present invention.

Alternatively, referring to FIG. 2, a co-located multicarrier transmitter in a composite amplifier configuration 20 comprises a first and second data source, 21a and 21b, a first and second modulator, 22a and 22b, a first and second RF amplifier, 23a and 23b, a summation circuit 24, and an antenna 25. The first and second digital bit streams generated respectively by the first and second data sources, 21a and 21b, are provided to first and second modulators, 22a and 22b, respectively. Each modulator converts the incoming digital information into a representative modulated signal or carrier. The outputs of the first and second modulators are fed into first and second RF amplifiers, 23a and 23b, respectively. The outputs of the RF amplifiers are combined into a single output signal by summation circuit 24, the output of which is applied to antenna 25 for transmission in a bandlimited channel.

Alternative embodiments of co-located transmitter systems are also possible. For example, the co-located transmitter configurations discussed above can be expanded to support more than two data sources and transmit more than two carriers in the bandlimited channel.

Because transmitter co-location does not give rise to the near-far problem to which the FCC mask requirements are directed, carrier spacings far closer than would ordinarily be allowed (e.g., 5 to 10 kHz) are achievable. Moreover, the carriers need not be symmetrically or evenly spaced within the mask defining the channel. That is, the frequency spacings between adjacent carriers, while symmetric to each other, can be smaller than the frequency spacings between the band edges of the mask and the nearest respective carrier. Indeed, carrier spacings may be irregular such that the carriers are asymmetrically located within the mask without incurring undue interference.

Figure 3A:
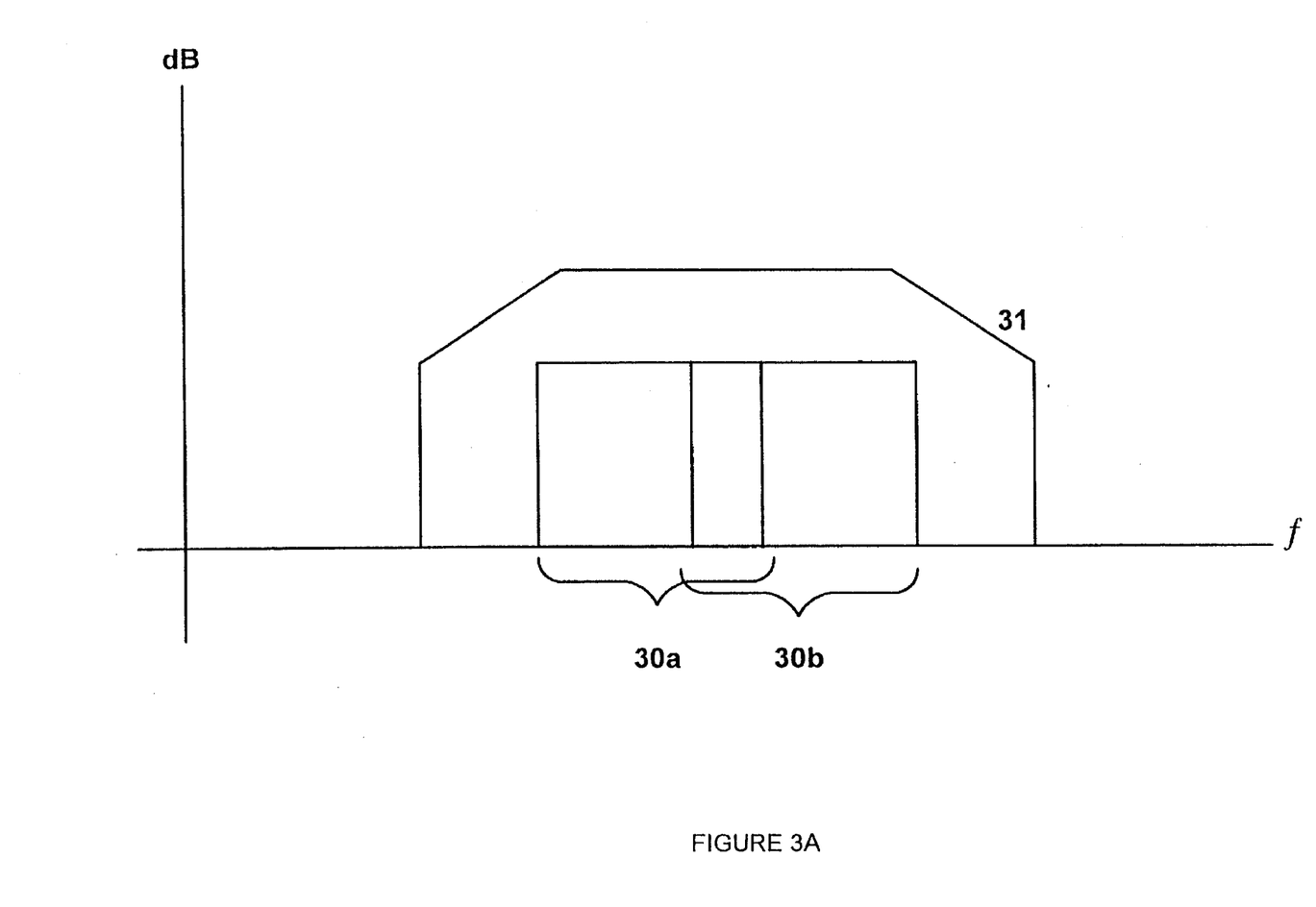
FIG. 3A is a graph depicting two submasks defining two subchannels in a single, mask-defined bandlimited channel.
Figure 3B:
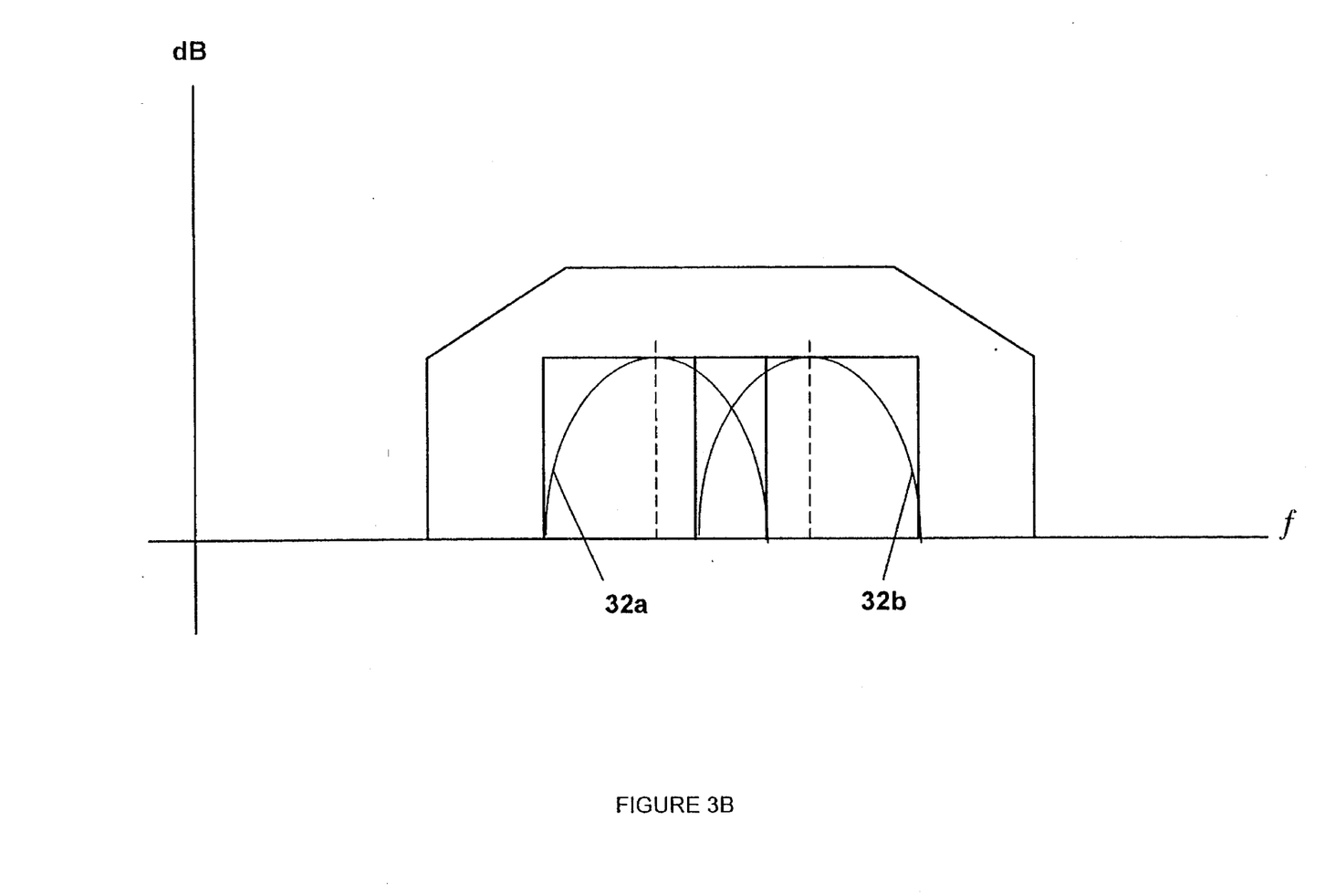
FIG. 3B is a graph depicting the power spectra of two carriers asymmetrically located within a single mask-defined, bandlimited channel.

Referring to FIG. 3A, two submasks defining two subchannels, 30a and 30b, are asymmetrically located within a single mask-defined, bandlimited channel 31, resulting in some subchannel overlap. FIG. 3B depicts two carriers, 32a and 32b, operating respectively over two asymmetrically-located subchannels, resulting in some carrier overlap. In accordance with this asymmetry, the frequency difference between the center frequency of each carrier and the nearest band edge of the mask is greater than half the frequency difference between the center frequencies of the two carriers.

The practical implication of transmitter co-location is that a greater range of operating parameters, including the peak frequency, deviation bit rate, and carrier frequencies, are available so that multicarrier modulation in a standard bandlimited channel can be obtained without the need for stringent subchannel interference protection. In accordance with the present invention, these and other parameters can be adjusted so that the carriers generated and transmitted according to the present invention will remain within the FCC emission limits while providing optimal transmission performance.

Figure 4:
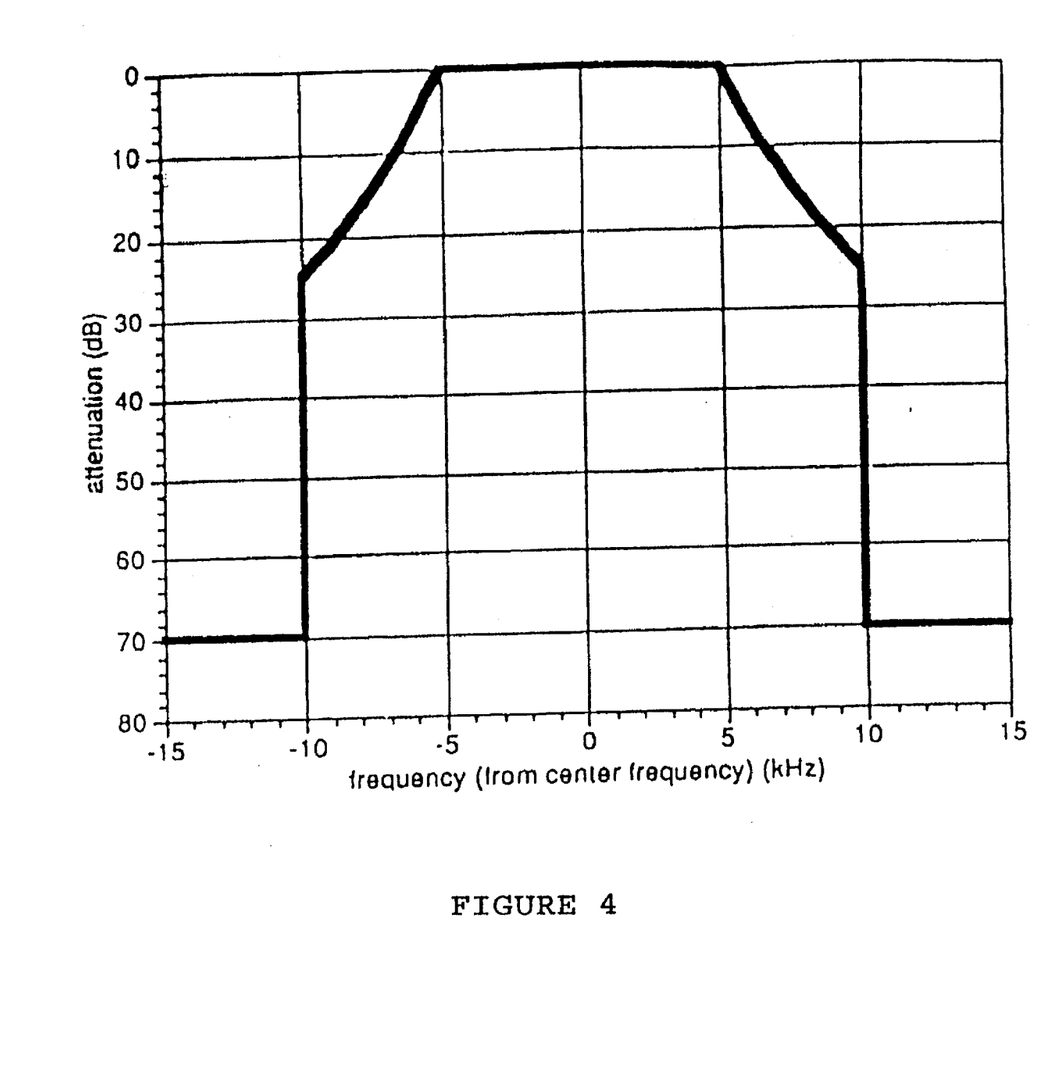
FIG. 4 is a graph depicting an exemplary FCC emissions mask that requires the power spectral density to be attenuated at least 70 dB within 10 kHz from center frequency.

FIG. 4 shows a FCC emissions mask which requires the power spectral density to be attenuated at least 70 dB within 10 kHz from center frequency. Co-location of the transmitters allows for signals with a greater range of deviation and baud rates to be carried in the bandlimited channel than has been otherwise thought possible in view of FCC 70 dB cutoff requirements. The present invention will be further clarified by the following examples, which are intended to be purely exemplary of the invention.

Figure 5A:
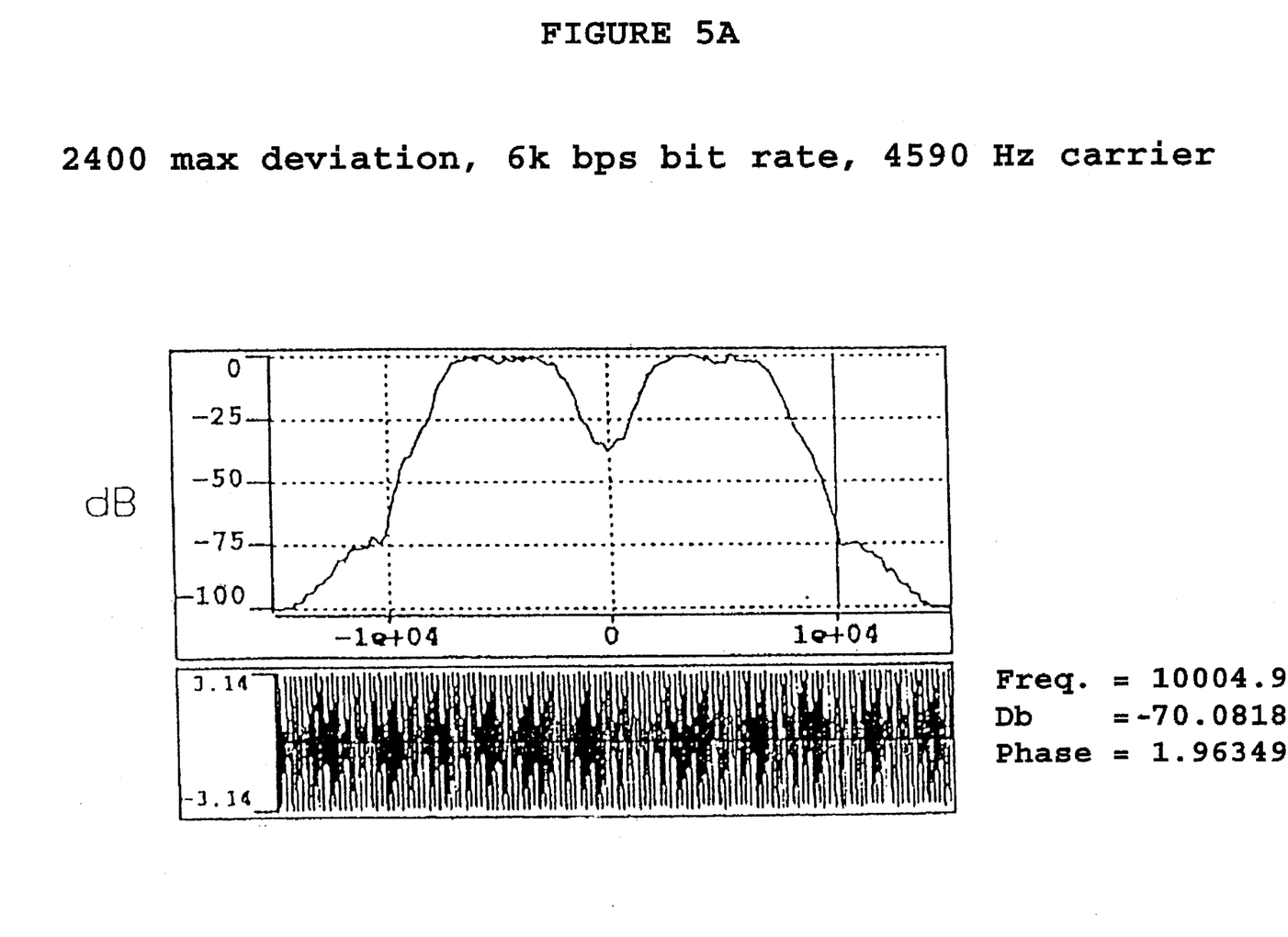
FIG. 5A is a graph depicting the power spectra of a system with peak deviation of 2400 Hz and data rate of 6000 bits per second (bps)
Figure 5B:
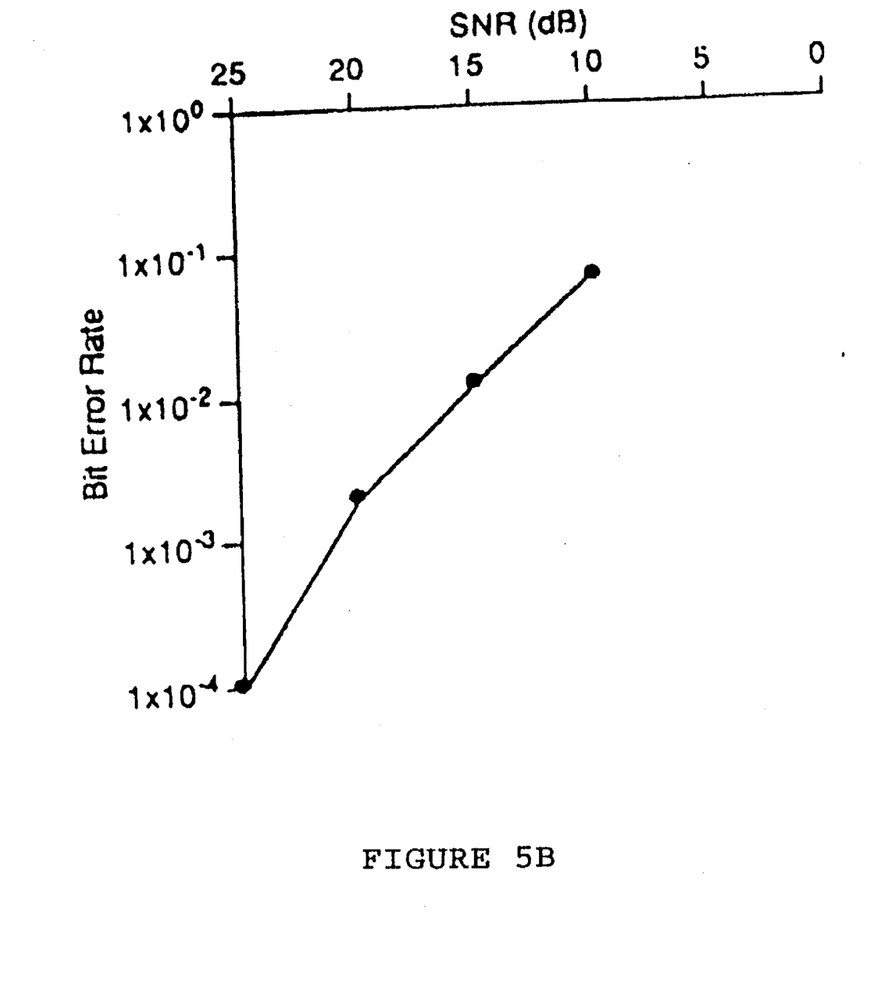
FIG. 5B is a graph depicting the performance of the system of FIG. 5A in terms of bit error rate versus the signal noise ratio (SNR)

FIG. 5A is a spectra graph of a two-carrier system in which the following parameter values were selected: a peak frequency deviation of 2400 Hz, a bit rate of 6000 bps, premodulation filter cutoff frequency of 3000 Hz, and carrier frequencies set to within 4590 Hz of the center frequency. Using this operative parameter combination, the carriers remained within the FCC mask while providing an acceptable error-rate versus signal strength performance (FIG. 5B).

Figure 6A:
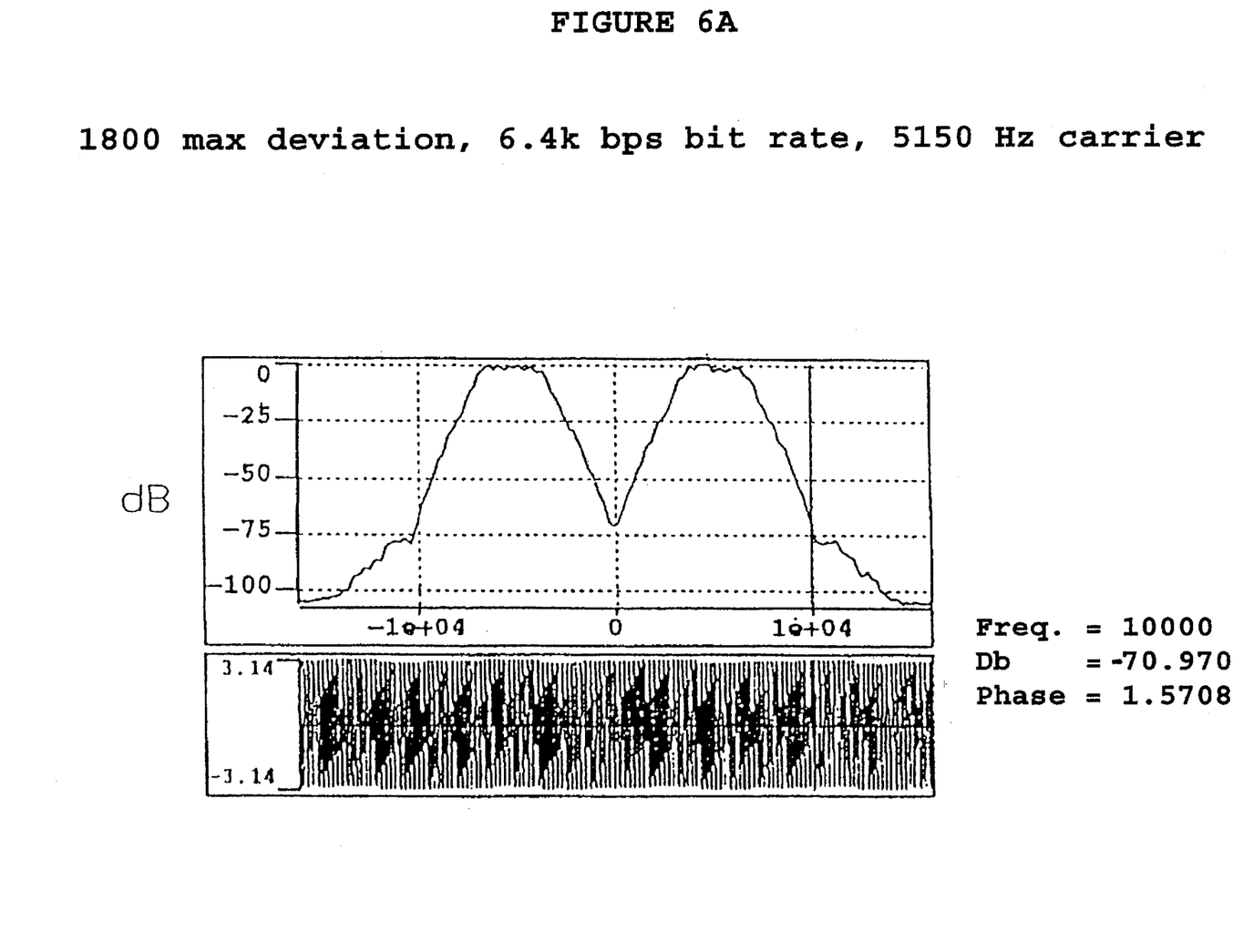
FIG. 6A is a graph depicting the power spectra of a system with peak deviation of 1800 Hz and a data rate of 6400 bps.
Figure 6B:
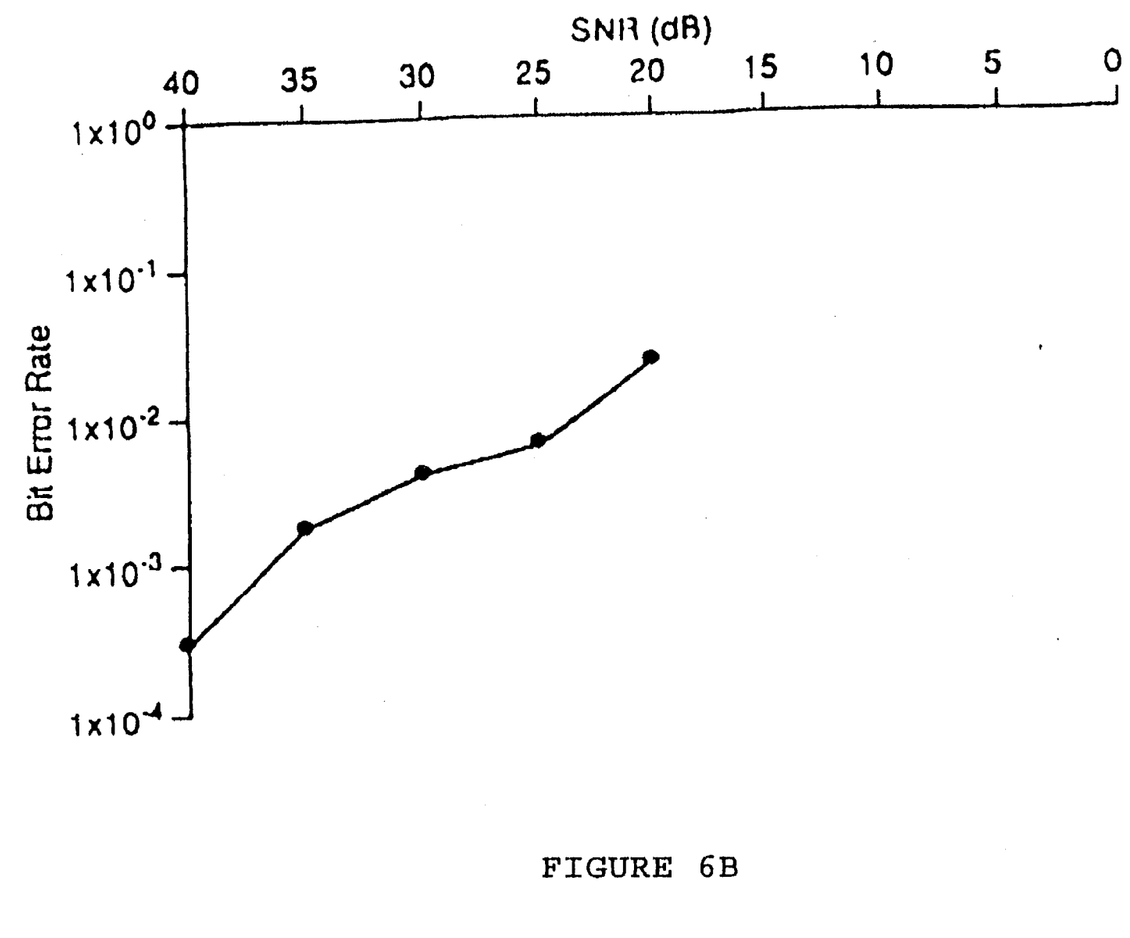
FIG. 6B is a graph depicting the performance of the system of FIG. 6A in terms of bit error rate versus SNR.

Alternatively, FIG. 6A is a spectra graph of a two-carrier system using a peak frequency deviation of 1800 Hz, a bit rate of 6400 bps, a premodulation filter cutoff frequency of 3200, and carrier frequencies set to within 5150 Hz of the center frequency. As depicted in FIG. 6B, this combination of operative parameters exhibited a higher bit error rate than the system of FIG. 5A.

Figure 7A:
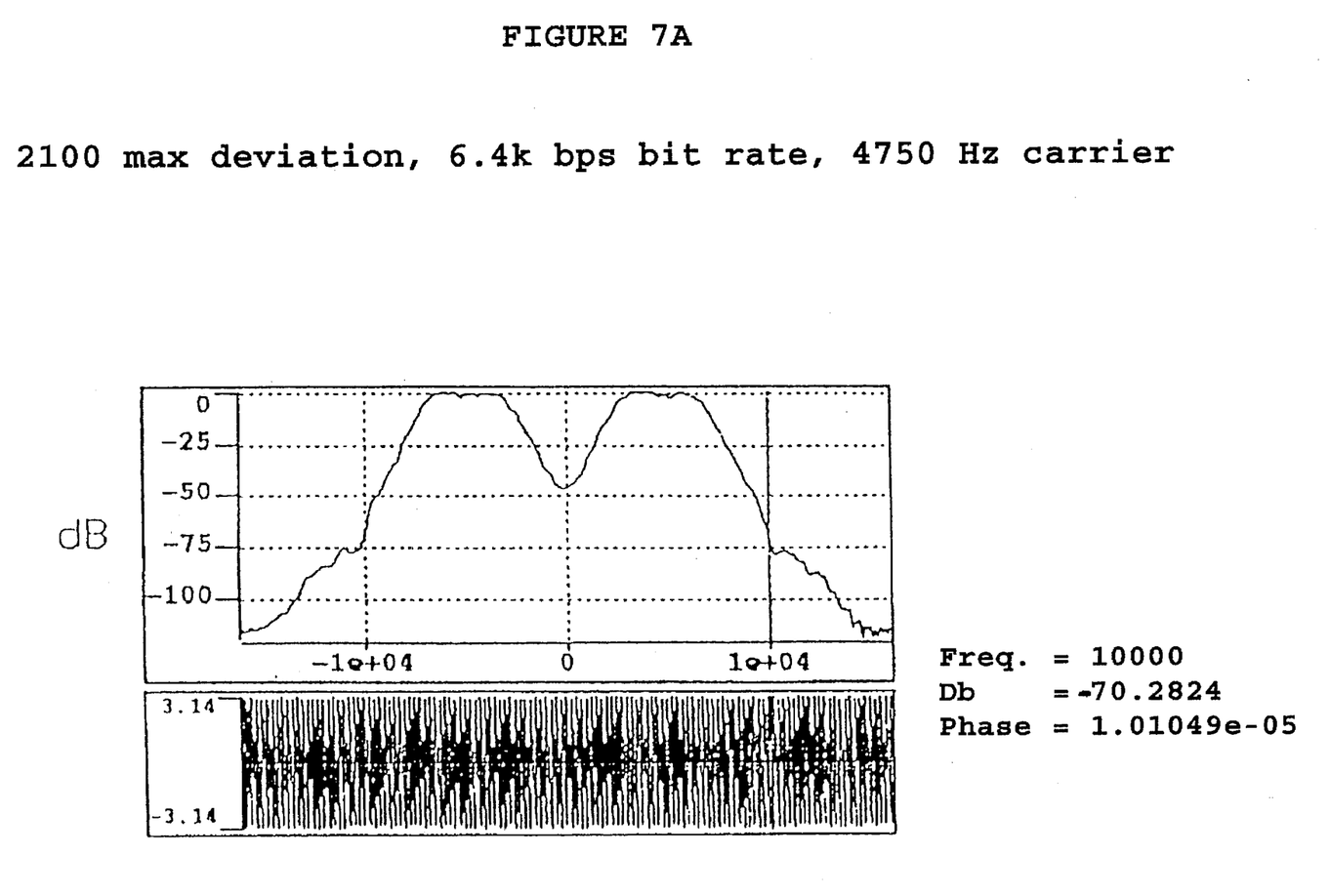
FIG. 7A is a graph depicting the power spectra of a system with peak deviation of 2100 Hz and a data rate of 6400 bps.
Figure 7B:
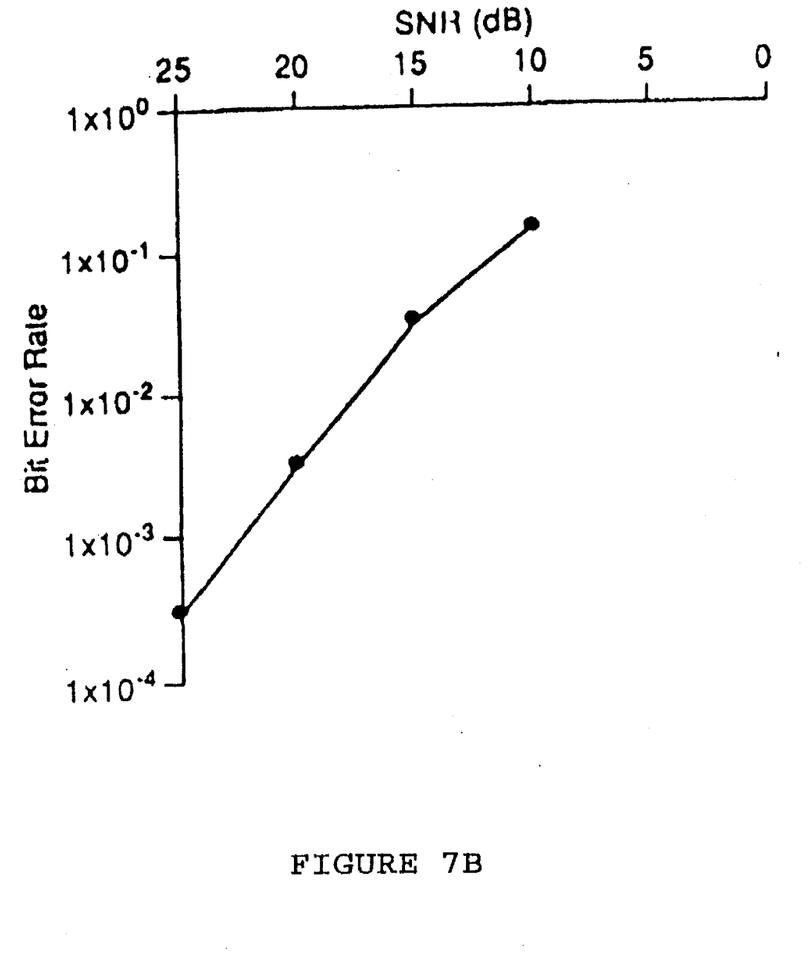
FIG. 7B is a graph depicting the performance of the system of FIG. 7A in terms of bit error rate versus SNR.

FIG. 7A is a spectra graph of a two-carrier system using a peak frequency deviation of 2100 Hz, a bit rate of 6400 bps, a premodulation filter cutoff frequency of 3200, and carrier frequencies set to within 4750 Hz of the center frequency. As depicted in FIG. 7B, this combination gives significantly better performance than the system of FIG. 6A but performs slightly worse than the system of FIG. 5A.

Thus, according to the present invention, increased transmission capacity is achieved by operating more than one carrier in a standard bandlimited channel assigned for mobile paging use, such as in the Narrowband Personal Communications Service or the Part 22 Service. In the modulation technique of the present invention, carriers operating at different frequencies are fit within a single bandwidth allocation in a manner consistent with FCC mask requirements. This is achieved through the use of co-located transmitters and the selection of an optimal combination of operating parameters, including peak frequency deviation, bit rate, and carrier separation frequencies. Through the multicarrier modulation technique of the present invention, the normal transmission capacity of a standard channel can be increased without the need for stringent subchannel protection levels and complicated receiver and transmitter schemes.

The modulation technique of the present invention has particular application in metropolitan areas where the volume and concentration of transmission traffic is high and where the need for increased transmission capacity is acute. In addition, the modulation technique of the present invention may also be suited for use in areas where the incidence of unacceptable interference is high, such as international border regions. In that type of environment, transmissions from the respective bordering countries can be assigned to one of the carriers operating within the channel to reduce the risk of interference.

It will be apparent to those skilled in the art that various modification and variations can be made to present invention without departing from the spirit or scope of the invention. Other embodiments of the invention will be apparent to those skilled in the art from consideration of the specification and practice of the invention disclosed herein. Thus, it is intended that the specification and examples be considered as exemplary only, with a true scope and spirit of the invention being indicated by the following claims.

What is claimed is:

1. A method of operating a plurality of paging carriers in a single mask-defined, bandlimited channel comprising the step of transmitting said carriers from the same location with said carriers having center frequencies within said channel such that the frequency difference between the center frequency of the outer most of said carriers and the band edge of the mask defining said channel is more than half the frequency difference between the center frequencies of each adjacent carrier.

2. The method of claim 1 wherein adjacent carriers overlap with each other.

3. A method of operating at least two paging carriers each in a corresponding subchannel of a single mask-defined, bandlimited channel comprising the step of transmitting said carriers from the same location with each carrier centrally located in said corresponding subchannel wherein the frequency difference between the center frequency of the outer most of said corresponding subchannels and the band edge of the mask defining said channel is more than half the frequency difference between the center frequencies of each adjacent carrier.

4. The method of claim 3 wherein adjacent subchannels overlap with each other.

5. In a paging system having a plurality of transmitters transmitting a plurality of modulated carriers over a single mask-defined, bandlimited channel and a plurality of mobile receiving units independently receiving one of said plurality of carriers, a method of operating said plurality of carriers in said channel to achieve higher transmission capacity comprising the steps of:

co-locating said plurality of transmitters such that said plurality of carriers can be emanated from the same transmission source; and transmitting said plurality of carriers over a plurality of subchannels spaced within the mask defining said channel wherein the frequency difference between the center frequency of the outer most carriers and the band edge of said mask is greater than half the frequency difference between the center frequencies of each adjacent carrier.

* * * * *